(12) United States Patent
Ren et al.

(10) Patent No.: US 12,309,094 B2
(45) Date of Patent: May 20, 2025

(54) METHODS FOR CONFIGURING AND RECEIVING TRANSMISSION RESOURCE FOR POSITIONING REFERENCE SIGNAL, AND USER EQUIPMENT

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 343 days.

(21) Appl. No.: 17/789,152

(22) PCT Filed: Oct. 14, 2020

(86) PCT No.: PCT/CN2020/120873
§ 371 (c)(1),
(2) Date: Jun. 24, 2022

(87) PCT Pub. No.: WO2021/129060
PCT Pub. Date: Jul. 1, 2021

(65) Prior Publication Data
US 2023/0050447 A1    Feb. 16, 2023

(30) Foreign Application Priority Data
Dec. 26, 2019   (CN) .................. 201911365078.2

(51) Int. Cl.
*H04L 5/00* (2006.01)

(52) U.S. Cl.
CPC .................. *H04L 5/0051* (2013.01)

(58) Field of Classification Search
CPC ............. H04L 5/0051; H04L 27/26025; H04L 5/0094; H04L 5/0048; H04L 5/0053;
(Continued)

(56) References Cited

U.S. PATENT DOCUMENTS

| | | | |
|---|---|---|---|
| 11,695,525 B2 * | 7/2023 | Da .................. | H04L 5/0048 370/329 |
| 2011/0081917 A1 * | 4/2011 | Frank ............... | H04W 64/00 455/456.1 |

(Continued)

FOREIGN PATENT DOCUMENTS

| | | |
|---|---|---|
| CN | 101931857 A | 12/2010 |
| CN | 101931862 A1 | 12/2010 |

(Continued)

OTHER PUBLICATIONS

International Search Report for PCT/CN2020/120873 issued on Dec. 30, 2020, and its English translation provided by WIPO.

(Continued)

*Primary Examiner* — Abdullahi E Salad
(74) *Attorney, Agent, or Firm* — Ladas & Parry, LLP

(57) ABSTRACT

Methods for configuring and receiving a transmission resource for a PRS, and a UE are provided. The method for configuring the transmission resource for a PRS includes transmitting an S-PRS resource set. An S-PRS resource comprised in the S-PRS resource set is preconfigured, or configured through PC5 RRC signaling, or configured through base station RRC signaling.

18 Claims, 5 Drawing Sheets

(58) Field of Classification Search
CPC .. G01S 2205/01; G01S 5/0072; G01S 5/0205; H04W 4/40; H04W 64/00
See application file for complete search history.

(56) References Cited

U.S. PATENT DOCUMENTS

| | | | |
|---|---|---|---|
| 2012/0027110 A1 | 2/2012 | Han et al. | |
| 2012/0094691 A1 | 4/2012 | Chen et al. | |
| 2013/0267246 A1* | 10/2013 | Wang | H04W 24/00 455/456.1 |
| 2016/0095092 A1 | 3/2016 | Khoryaev et al. | |
| 2017/0142682 A1* | 5/2017 | Gunnarsson | G01S 1/20 |
| 2017/0289831 A1 | 10/2017 | Park et al. | |
| 2018/0048444 A1 | 2/2018 | Park et al. | |
| 2018/0098314 A1* | 4/2018 | Rico Alvarino | H04W 72/23 |
| 2018/0331799 A1 | 11/2018 | Zhang et al. | |
| 2019/0230618 A1 | 7/2019 | Saur et al. | |
| 2019/0239181 A1 | 8/2019 | Gangakhedkar et al. | |
| 2020/0408871 A1* | 12/2020 | Da | G01S 1/20 |
| 2021/0112522 A1* | 4/2021 | Kim | H04W 64/00 |
| 2022/0014325 A1 | 1/2022 | Zhao | |
| 2022/0385423 A1* | 12/2022 | Ko | G01S 5/0072 |

FOREIGN PATENT DOCUMENTS

| | | |
|---|---|---|
| CN | 102422663 A1 | 4/2012 |
| CN | 102595450 A | 7/2012 |
| CN | 104010363 A | 8/2014 |
| CN | 106656446 A1 | 5/2017 |
| CN | 106664518 A | 5/2017 |
| CN | 107852582 A | 3/2018 |
| CN | 109327901 A1 | 2/2019 |
| CN | 109644458 A | 4/2019 |
| CN | 110383862 A | 10/2019 |
| CN | 110536234 A | 12/2019 |
| CN | 110545533 A | 12/2019 |
| EP | 3742829 A1 | 11/2020 |
| EP | 4054102 A1 | 9/2022 |
| WO | 2012094973 A1 | 7/2012 |
| WO | 2013139041 A1 | 9/2013 |
| WO | 2014131349 A1 | 9/2014 |
| WO | 2018028941 A1 | 2/2018 |
| WO | 2018178751 A1 | 10/2018 |
| WO | 2019141090 A1 | 7/2019 |

OTHER PUBLICATIONS

Written Opinion for PCT/CN2020/120873 issued on Dec. 30, 2020, and its English translation provided by WIPO.
International Preliminary Report for PCT/CN2020/120873 issued on Jun. 28, 2022 and its English translation provided by WIPO.
First Office Action and search report for Chinese Patent Application 201911365078.2 issued on Nov. 26, 2021, and its English translation provided by the Chinese Patent Office.
Extended European Search Report for corresponding European Patent Application No. 20904335.5 issued on Feb. 6, 2023.
PCT International Search Report and Written Opinion from PCT/CN2020/134192 dated Mar. 8, 2021, and its English translation.
Extended search report from European Patent Application No. 20901648.4 dated Dec. 12, 2022.
Intel Corporation: "Feature Lead Summary #2 on AI 7.2.10.1—DL Reference Signals for NR Positioning", 3GPP Draft; R1-1913473, 3rd Generation Partnership Project (3GPP), Mobile Competence Centre; 650, Route Des Lucioles; F-06921 Sophia-Antipolis Cedex; France, vol. RAN WG1, No. Reno, US; Nov. 18, 2019-Nov. 22, 2019, Nov. 25, 2019 (Nov. 25, 2019), XP051830750.
Office action and search report from Chinese Patent Application No. 201911302240.6 with search report, dated Nov. 2, 2021, and its English translation.
Huawei, "DL and UL Reference Signals for NR Positioning," 3GPP TSG RAN WGI Meeting #96bis, Xi'an, China, Apr. 8-Apr. 12, 2019, R1-1904004.
Huawei, HiSilicon, DL RS design for NR positioning, 3GPP TSG RAN WGI #97, Reno. USA, May 13-17, 2019, R1-1906082.

* cited by examiner transmitting an S-PRS resource set, an S-PRS resource included in the S-PRS resource set being preconfigured, or configured through PC5 RRC signaling, or configured through base station RRC signaling    21

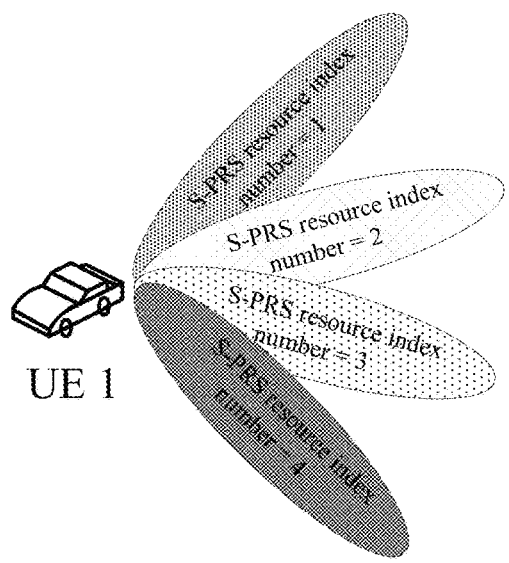
Fig.7
receiving an S-PRS resource set, an S-PRS resource included in the S-PRS resource set being preconfigured, or configured through PC5 RRC signaling, or configured through base station RRC signaling — 81
Fig.8
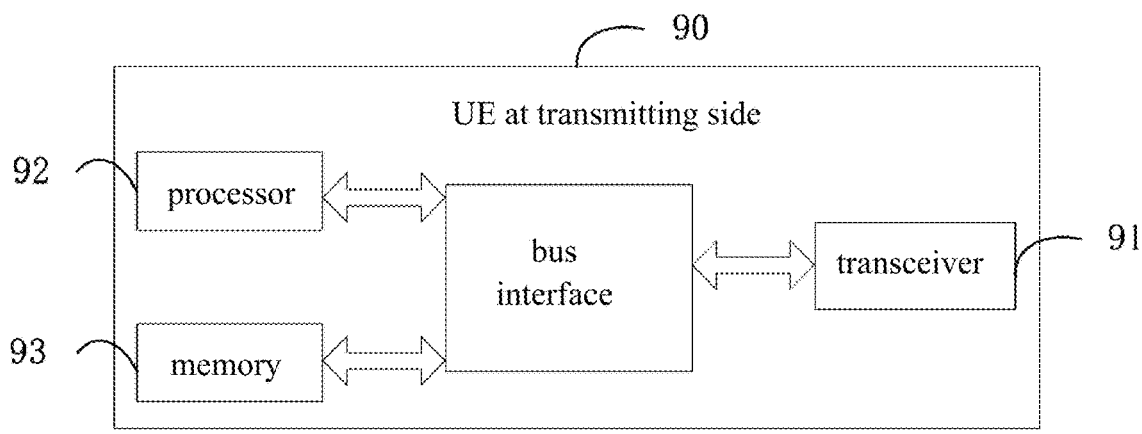
Fig.9

METHODS FOR CONFIGURING AND RECEIVING TRANSMISSION RESOURCE FOR POSITIONING REFERENCE SIGNAL, AND USER EQUIPMENT

CROSS-REFERENCE TO RELATED APPLICATIONS

This application is the U.S. national phase of PCT Application No. PCT/CN2020/120873 filed on Oct. 14, 2020, which claims a priority to the Chinese patent application No. 201911365078.2 filed in China on Dec. 26, 2019, the disclosures of which are incorporated herein by reference in their entireties.

TECHNICAL FIELD

The present disclosure relates to the field of communication technology, in particular to a method for configuring a transmission resource for a positioning reference signal, a method for receiving a transmission resource for a positioning reference signal, and a User Equipment (UE).

BACKGROUND

In order to support a driverless function, a New Radio (NR) Vehicle-to-Everything (V2X) system also needs to perform positioning to obtain a position of one vehicle relative to another. In order to achieve the relative positioning between the vehicles, one vehicle needs to transmit a Sidelink Positioning Reference Signal (S-PRS) via a Sidelink interface, and then a neighboring vehicle may obtain its position relative to the vehicle through the measurement and calculation in accordance with the S-PRS.

As shown in FIG. 1, a plurality of S-PRSs is transmitted by a UE 1, and each of the other UEs surrounding the UE 1, e.g., a UE 2 to a UE 5, may obtain its position relative to the UE 1 in accordance with the S-PRSs from the UE 1.

Different Frequency Ranges (FRs), i.e., FR1 and FR2, are defined in a $5^{th}$-Generation (5G) NR. FR1 refers to a 5G Sub-6 GHz (less than 6 GHz) frequency band, and FR2 refers to a 5G millimeter wave frequency band. For the UE, a wave for the S-PRS is very narrow within FR2, so a plurality of S-PRS beams needs to be transmitted in a beam scanning mode. A time/frequency resource occupied by each of the S-PRS beams is called as one S-PRS resource, and all the S-PRS resources are grouped into one S-PRS resource set. For one S-PRS resource set, it at most includes 64 S-PRS resources. How to configure time/frequency resource positions occupied by these PRS resources becomes a problem to be solved.

In the related art, the S-PRS resource set transmitted by the UE fails to be defined, and there is no scheme about how to configure the plurality of S-PRS resources.

SUMMARY

An object of the present disclosure is to provide a method for configuring a transmission resource for a positioning reference signal, a method for receiving a transmission resource for a positioning reference signal, and a UE, so as to enable the UE to obtain PRS resource information included in an S-PRS resource set through a small signaling overhead, thereby to enable the UE to complete a Sidelink positioning procedure in accordance with a received S-PRS resource, and reduce the signaling overhead and implementation complexity.

In order to solve the above-mentioned technical problem, the present disclosure provides the following technical solutions.

In one aspect, the present disclosure provides in some embodiments a method for configuring a transmission resource for a PRS for a UE, including transmitting an S-PRS resource set. An S-PRS resource included in the S-PRS resource set is preconfigured, or configured through PC5 Radio Resource Control (RRC) signaling, or configured through base station RRC signaling.

In a possible embodiment of the present disclosure, in a configuration pattern for each S-PRS resource included in the S-PRS resource set, at least one of the following parameters is pre-configured or configured through signaling: an offset amount of a first S-PRS resource in one S-PRS resource set relative to a first reference point; the quantity of S-PRS resources in one S-PRS resource set; the quantity of S-PRS resource groups included in one S-PRS resource set; a time interval between two adjacent S-PRS resource groups included in one S-PRS resource set; the quantity of S-PRS resources included in one S-PRS resource group; or a time interval between two adjacent S-PRS resources included in one S-PRS resource group.

In a possible embodiment of the present disclosure, the offset amount of the first S-PRS resource in one S-PRS resource set relative to the first reference point includes the quantity of slots and/or the quantity of symbols by which the first S-PRS resource in one S-PRS resource is offset relative to the first reference point.

In a possible embodiment of the present disclosure, the first reference point is at least one of a first slot within a first radio frame, a start position of an S-PRS resource set period to which the S-PRS resource belongs, or a first slot within a radio frame where the first S-PRS resource included in the S-PRS resource set to which the S-PRS resource belongs is located.

In a possible embodiment of the present disclosure, when one S-PRS resource set includes at least two S-PRS resource groups, the time interval between the two adjacent S-PRS resource groups in the S-PRS resource set is the quantity of slots and/or the quantity of symbols between the two adjacent S-PRS resource groups in the S-PRS resource set, and the time intervals between every two adjacent S-PRS resource groups are the same or different.

In a possible embodiment of the present disclosure, the time intervals between every two adjacent S-PRS resource groups included in one S-PRS resource set are X0 slots and/or X1 symbols, where X0 and X1 are each a positive integer greater than or equal to 1.

In a possible embodiment of the present disclosure, the quantity of S-PRS resources in each S-PRS resource group is the same.

In a possible embodiment of the present disclosure, the time interval between the two adjacent S-PRS resources included in one S-PRS resource group is the quantity of slots and/or the quantity of symbols between the two adjacent S-PRS resources in the S-PRS resource group, and the time intervals between every two adjacent S-PRS resources included in one S-PRS resource group are the same or different.

In a possible embodiment of the present disclosure, the time intervals between every two adjacent S-PRS resources included in one S-PRS resource group are Y0 slots and/or Y1 symbols, where Y0 and Y1 are each a positive integer greater than or equal to 1.

In a possible embodiment of the present disclosure, a value of the parameter is determined in accordance with at least one of a SubCarrier Spacing (SCS) used by the UE, an FR and information carried in a Physical Sidelink Broadcast Channel (PSBCH).

In a possible embodiment of the present disclosure, at least one of a slot offset amount of each S-PRS resource relative to a second reference point or a symbol offset amount relative to a third reference point is preconfigured or configured.

In a possible embodiment of the present disclosure, the second reference point for the slot offset amount is one of a start position of an S-PRS resource set period, a first slot within a radio frame where a first S-PRS resource in an S-PRS resource set to which the S-PRS resource belongs is located, a slot where the first S-PRS resource included in the S-PRS resource set to which the S-PRS resource belongs is located, or a start position of the S-PRS resource set to which the S-PRS resource belongs.

In a possible embodiment of the present disclosure, the third reference point for the symbol offset amount is a first symbol within a slot where the S-PRS resource is located.

In a possible embodiment of the present disclosure, the quantity of symbols occupied by each S-PRS resource in one S-PRS resource set is configurable.

In a possible embodiment of the present disclosure, the quantity of symbols occupied by each S-PRS resource in one S-PRS resource set is the same.

In a possible embodiment of the present disclosure, when a normal Cyclic Prefix (CP) is configured in a system, the quantity of symbols occupied by one S-PRS resource is 2, 4, 6 or 12, and when an extended CP is configured in the system, the quantity of symbols occupied by one S-PRS resource is 2, 4 or 6.

In a possible embodiment of the present disclosure, the quantity of S-PRS resources in one S-PRS resource set is the same as the quantity of Sidelink-Synchronous Signal Blocks (S-SSBs) in a set of Sidelink synchronous resources within a Sidelink synchronization period.

In a possible embodiment of the present disclosure, an S-PRS period configured by the UE is the same as the Sidelink synchronization period.

In a possible embodiment of the present disclosure, when a beam direction of an S-PRS resource is the same as a beam direction of an S-SSB, an index number of the S-PRS resource is the same as an index number of the S-SSB.

In a possible embodiment of the present disclosure, each of the S-PRS resources having a same index number as the S-SSB transmission resource is offset by a same offset amount from the S-SSB transmission resource, and the offset amount is configurable.

In a possible embodiment of the present disclosure, the slot is a physical slot, an NR air-interface slot, an uplink slot or a Sidelink slot, and the symbol is a physical Orthogonal Frequency Division Multiplexing (OFDM) symbol, an NR air-interface OFDM symbol, an uplink symbol or a Sidelink symbol.

In another aspect, the present disclosure provides in some embodiments a method for receiving a transmission resource for a PRS for a UE, including receiving an S-PRS resource set. An S-PRS resource included in the S-PRS resource set is preconfigured, or configured through PC5 RRC signaling, or configured through base station RRC signaling.

In a possible embodiment of the present disclosure, in a configuration pattern for each S-PRS resource included in the S-PRS resource set, at least one of the following parameters is pre-configured or configured through signaling: an offset amount of a first S-PRS resource in one S-PRS resource set relative to a first reference point; the quantity of S-PRS resources in one S-PRS resource set; the quantity of S-PRS resource groups included in one S-PRS resource set; a time interval between two adjacent S-PRS resource groups included in one S-PRS resource set; the quantity of S-PRS resources included in one S-PRS resource group; or a time interval between two adjacent S-PRS resources included in one S-PRS resource group.

In a possible embodiment of the present disclosure, the offset amount of the first S-PRS resource in one S-PRS resource set relative to the first reference point includes the quantity of slots and/or the quantity of symbols by which the first S-PRS resource in one S-PRS resource is offset relative to the first reference point.

In a possible embodiment of the present disclosure, the first reference point is at least one of a first slot within a first radio frame, a start position of an S-PRS resource set period to which the S-PRS resource belongs, or a first slot within a radio frame where the first S-PRS resource included in the S-PRS resource set to which the S-PRS resource belongs is located.

In a possible embodiment of the present disclosure, when one S-PRS resource set includes at least two S-PRS resource groups, the time interval between the two adjacent S-PRS resource groups in the S-PRS resource set is the quantity of slots and/or the quantity of symbols between the two adjacent S-PRS resource groups in the S-PRS resource set, and the time intervals between every two adjacent S-PRS resource groups are the same or different.

In a possible embodiment of the present disclosure, the time intervals between every two adjacent S-PRS resource groups included in one S-PRS resource set are X0 slots and/or X1 symbols, where X0 and X1 are each a positive integer greater than or equal to 1.

In a possible embodiment of the present disclosure, the quantity of S-PRS resources in each S-PRS resource group is the same.

In a possible embodiment of the present disclosure, the time interval between the two adjacent S-PRS resources included in one S-PRS resource group is the quantity of slots and/or the quantity of symbols between the two adjacent S-PRS resources in the S-PRS resource group, and the time intervals between every two adjacent S-PRS resources included in one S-PRS resource group are the same or different.

In a possible embodiment of the present disclosure, the time intervals between every two adjacent S-PRS resources included in one S-PRS resource group are Y0 slots and/or Y1 symbols, where Y0 and Y1 are each a positive integer greater than or equal to 1.

In a possible embodiment of the present disclosure, a value of the parameter is determined in accordance with at least one of an SCS used by the UE, an FR and information carried in a PSBCH.

In a possible embodiment of the present disclosure, at least one of a slot offset amount of each S-PRS resource relative to a second reference point or a symbol offset amount relative to a third reference point is preconfigured or configured.

In a possible embodiment of the present disclosure, the second reference point for the slot offset amount is one of a start position of an S-PRS resource set period, a first slot within a radio frame where a first S-PRS resource in an S-PRS resource set to which the S-PRS resource belongs is located, a slot where the first S-PRS resource included in the S-PRS resource set to which the S-PRS resource belongs is located, or a start position of the S-PRS resource set to which the S-PRS resource belongs.

In a possible embodiment of the present disclosure, the third reference point for the symbol offset amount is a first symbol within a slot where the S-PRS resource is located.

In a possible embodiment of the present disclosure, the quantity of symbols occupied by each S-PRS resource in one S-PRS resource set is configurable.

In a possible embodiment of the present disclosure, the quantity of symbols occupied by each S-PRS resource in one S-PRS resource set is the same.

In a possible embodiment of the present disclosure, when a normal CP is configured in a system, the quantity of symbols occupied by one S-PRS resource is 2, 4, 6 or 12, and when an extended CP is configured in the system, the quantity of symbols occupied by one S-PRS resource is 2, 4 or 6.

In a possible embodiment of the present disclosure, the quantity of S-PRS resources in one S-PRS resource set is the same as the quantity of S-SSBs in a set of Sidelink synchronous resources within a Sidelink synchronization period.

In a possible embodiment of the present disclosure, an S-PRS period configured by the UE is the same as the Sidelink synchronization period.

In a possible embodiment of the present disclosure, when a beam direction of an S-PRS resource is the same as a beam direction of an S-SSB, an index number of the S-PRS resource is the same as an index number of the S-SSB.

In a possible embodiment of the present disclosure, each of the S-PRS resources having a same index number as the S-SSB transmission resource is offset by a same offset amount from the S-SSB transmission resource, and the offset amount is configurable.

In a possible embodiment of the present disclosure, the slot is a physical slot, an NR air-interface slot, an uplink slot or a Sidelink slot, and the symbol is a physical OFDM symbol, an NR air-interface OFDM symbol, an uplink symbol or a Sidelink symbol.

In yet another aspect, the present disclosure provides in some embodiments a UE, including a transceiver, a processor, and a memory storing therein a program to be executed by the processor. The processor is configured to execute the program, so as to transmit an S-PRS resource set. An S-PRS resource included in the S-PRS resource set is preconfigured, or configured through PC5 RRC signaling, or configured through base station RRC signaling.

In still yet another aspect, the present disclosure provides in some embodiments a device for configuring a transmission resource for a PRS, including a transceiver module configured to transmit an S-PRS resource set. An S-PRS resource included in the S-PRS resource set is preconfigured, or configured through PC5 RRC signaling, or configured through base station RRC signaling.

In still yet another aspect, the present disclosure provides in some embodiments a UE, including a transceiver, a processor, and a memory storing therein a program to be executed by the processor. The processor is configured to execute the program, so as to receive an S-PRS resource set. An S-PRS resource included in the S-PRS resource set is preconfigured, or configured through PC5 RRC signaling, or configured through base station RRC signaling.

In still yet another aspect, the present disclosure provides in some embodiments a device for receiving a transmission resource for a PRS, including a transceiver module configured to receive an S-PRS resource set. An S-PRS resource included in the S-PRS resource set is preconfigured, or configured through PC5 RRC signaling, or configured through base station RRC signaling.

In still yet another aspect, the present disclosure provides in some embodiments a processor-readable storage medium storing therein an instruction to be executed by a processor. The instruction is executed by the processor so as to implement the above-mentioned methods.

The present disclosure has the following beneficial effects.

According to the embodiments of the present disclosure, a configuration scheme adapted to the S-PRS resource set has been given. Through this scheme, the UE may, through small signaling overhead, obtain information about a transmission occasion for the PRS resource included in the S-PRS resource set. As a result, it is able for the UE to implement the Sidelink positioning procedure in accordance with the received S-PRS resource, thereby to reduce the signaling overhead as well as the implementation complexity.

BRIEF DESCRIPTION OF THE DRAWINGS

FIG. 7 is a schematic view showing S-SSB beam scanning performed by the UE 1 according to an embodiment of the present disclosure;

FIG. 8 is a flow chart of a method for receiving a transmission resource for a PRS by the UE according to an embodiment of the present disclosure;

FIG. 9 is a schematic view showing architecture of a UE at a transmitting side according to an embodiment of the present disclosure;

DETAILED DESCRIPTION

Figures 1, 2:
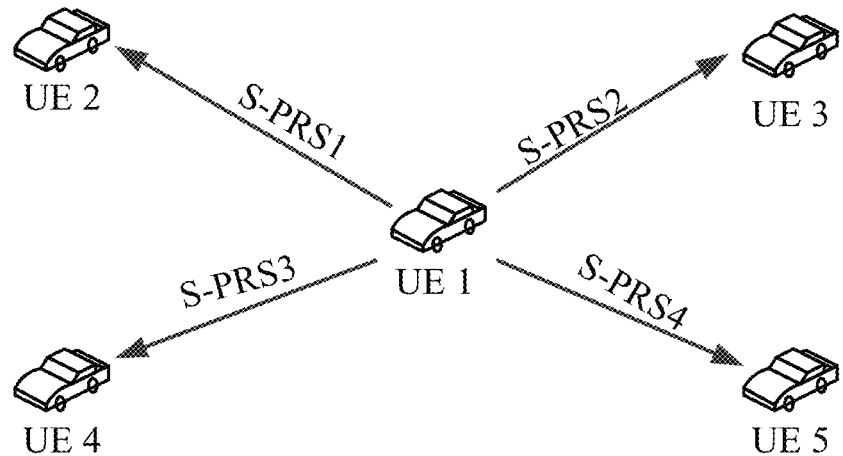
FIG. 1 is a schematic view showing the transmission of a PRS by a UE.
FIG. 2 is a flow chart of a method for configuring a transmission resource for a PRS according to an embodiment of the present disclosure.

Exemplary embodiments of the present disclosure will be described in more detail below with reference to the accompanying drawings. While exemplary embodiments of the present disclosure are shown in the drawings, it should be understood that the present disclosure may be embodied in various forms and should not be limited by the embodiments set forth herein. Rather, these embodiments are provided so that the present disclosure will be more thoroughly understood, and will fully convey the scope of the present disclosure to those skilled in the art.

In a 5G NR V2X system, sidelink communication is performed between UEs through a PC5 interface (Sidelink). Prior to the transmission of service data, at first synchronization needs to be established between the two UEs at the PC5 interface (Sidelink). A synchronization signal for the NR V2X system is carried in a Sidelink Synchronization Signal Block (S-SSB). One S-SSB is carried in each slot, and the S-SSB consists of a Sidelink-Primary Synchronization Signal (S-PSS), a Sidelink-Secondary Synchronization Signal (S-SSS) and a PSBCH. As a method for establishing the synchronization, a UE A transmits the S-SSB, another UE B receives the S-SSB transmitted by the UE A, and a plurality of S-SSBs may probably be transmitted. Once the UE B has received and demodulated the S-SSB successfully, the synchronization is established between the two UEs for the subsequent Sidelink communication.

After the synchronization has been established between the two UEs, the Sidelink communication may be performed. During the communication, a UE in the NR V2X system may transmit various service channels and signals, e.g., a Physical Sidelink Control Channel (PSCCH), a Physical Sidelink Shared Channel (PSSCH), a Physical Sidelink Feedback Channel (PSFCH) and various Sidelink Reference Signals such as Sidelink Demodulation Reference Signal (SL DMRS), Sidelink Channel State Information Reference Signal (SL CSI-RS) and Sidelink Phase-tracking Reference Signal (SL PT-RS), to complete a Sidelink communication process between vehicles.

In addition, for Sidelink slots, a first symbol within each slot is used for Automatic Gain Control (AGC), so as to adjust a power amplifier and adapt to a rapid change in received signal strength. A last symbol within each slot is used for Guard Period (GP), so as to provide a reserved time for transmission and reception switch or eliminate inter-symbol interference caused by a timing offset.

As shown in FIG. 2, the present disclosure provides in some embodiments a method for configuring a transmission resource for a PRS for a UE, which includes Step 21 of transmitting an S-PRS resource set. An S-PRS resource included in the S-PRS resource set is preconfigured, or configured through PC5 RRC signaling, or configured through base station RRC signaling.

In a possible embodiment of the present disclosure, when the UE is outside a coverage range of a network device, the S-PRS resource is preconfigured, or configured through the PC5 RRC signaling.

In a possible embodiment of the present disclosure, when the UE is within the coverage range of the network device, the S-PRS resource is configured through the base station RRC signaling.

During the implementation, in the embodiments of the present disclosure, different configuration modes are selected in accordance with different scenarios. One S-PRS resource set includes at least one S-PRS resource, and each S-PRS resource is preconfigured, or configured through the PC5 RRC signaling, or configured through the base station RRC signaling. In actual configuration, a specific configuration scheme depends on an actual scenario. Hence, the S-PRS transmitted by the UE is preconfigured or configured in accordance with different scenarios through one or more of the following three modes: (1) preconfiguring the PRS at a UE side; (2) configuring the PRS at the UE side through the PC5 RRC signaling; and (3) configuring the PRS at the UE side through the base station RRC signaling.

It is impossible for the UE outside a coverage range of a base station to receive the base station signaling, so the S-PRS resource is pre-configured or configured through only the PC5 RRC signaling. Once the UE moves into the coverage range of the base station, it may receive the base station RRC signaling so as to configure the S-PRS resource.

The UE within the coverage range of the base station may receive the base station signaling, so it may configure a transmission occasion for the S-PRS resource directly through the base station RRC signaling.

According to the embodiments of the present disclosure, different configuration modes are selected flexibly in accordance with different scenarios, so it is able for the UE outside the coverage range and the UE within the coverage range to obtain configuration information about the S-PRS, thereby to perform Sidelink positioning in accordance with the configuration information about the S-PRS.

In a possible embodiment of the present disclosure, in a configuration pattern for each S-PRS resource included in the S-PRS resource set, at least one of the following parameters is pre-configured or configured through signaling: an offset amount of a first S-PRS resource in one S-PRS resource set relative to a first reference point; the quantity of S-PRS resources in one S-PRS resource set; the quantity of S-PRS resource groups included in one S-PRS resource set; a time interval between two adjacent S-PRS resource groups included in one S-PRS resource set; the quantity of S-PRS resources included in one S-PRS resource group; or a time interval between two adjacent S-PRS resources included in one S-PRS resource group.

In a possible embodiment of the present disclosure, the offset amount of the first S-PRS resource in one S-PRS resource set relative to the first reference point includes the quantity of slots and/or the quantity of symbols by which the first S-PRS resource in one S-PRS resource is offset relative to the first reference point.

In a possible embodiment of the present disclosure, the first reference point is at least one of a first slot within a first radio frame (the first slot within the first radio frame refers to System Frame Number (SFN) 0 slot 0), a start position of an S-PRS resource set period to which the S-PRS resource belongs, or a first slot within a radio frame where the first S-PRS resource included in the S-PRS resource set to which the S-PRS resource belongs is located.

In a possible embodiment of the present disclosure, all the S-PRS resources may form an S-PRS resource set, and a part of the S-PRS resources may form a resource group. When one S-PRS resource set includes at least two S-PRS resource groups, the time interval between the two adjacent S-PRS resource groups in the S-PRS resource set is the quantity of slots and/or the quantity of symbols between the two adjacent S-PRS resource groups in the S-PRS resource set, and the time intervals between every two adjacent S-PRS resource groups are the same or different.

In a possible embodiment of the present disclosure, the time intervals between every two adjacent S-PRS resource groups included in one S-PRS resource set are X0 slots and/or X1 symbols, where X0 and X1 are each a positive integer greater than or equal to 1.

In a possible embodiment of the present disclosure, the quantity of S-PRS resources in each S-PRS resource group is the same.

In a possible embodiment of the present disclosure, the time interval between the two adjacent S-PRS resources included in one S-PRS resource group is the quantity of slots and/or the quantity of symbols between the two adjacent S-PRS resources in the S-PRS resource group, and the time intervals between every two adjacent S-PRS resources included in one S-PRS resource group are the same or different.

In a possible embodiment of the present disclosure, the time intervals between every two adjacent S-PRS resources included in one S-PRS resource group are Y0 slots and/or Y1 symbols, where Y0 and Y1 are each a positive integer greater than or equal to 1.

In a possible embodiment of the present disclosure, a value of the parameter is determined in accordance with at least one of an SCS used by the UE, an FR and information carried in a PSBCH.

During the implementation, in a relative position configuration of the S-PRS resource, each S-PRS resource in one S-PRS resource set is preconfigured, or configured through the PC5 RRC signaling, or configured through the base station RRC signaling. Through the relative position configuration scheme, at least one of N1 to N6 is preconfigured or configured, where N1 indicates an offset amount of the first S-PRS resource in one S-PRS resource set relative to the first reference point, N2 indicates the quantity of S-PRS resources in one S-PRS resource set, N3 indicates the quantity of S-PRS resource groups included in one S-PRS resource set, N4 indicates the time interval between two adjacent S-PRS resource groups included in one S-PRS resource set, N5 indicates the quantity of S-PRS resources included in one S-PRS resource group, and N6 indicates the time interval between two adjacent S-PRS resources included in one S-PRS resource group.

N1 refers to one or both of the quantity of slots or the quantity of symbols of offset relative to the start position of the period. The first reference point may be one of the start position of the S-PRS resource set period to which the S-PRS resource belongs, or the first slot, e.g., slot 0, within the radio frame where the first S-PRS resource included in the S-PRS resource set to which the S-PRS resource belongs is located.

Particularly, when N3, N4 and N5 are not configured, the entire S-PRS resource set is just one S-PRS resource group.

In a possible embodiment of the present disclosure, when one S-PRS resource set includes at least two S-PRS resource groups, the time interval (N4) between the two adjacent S-PRS resource groups in the S-PRS resource set is one or both of the quantity of slots and the quantity of symbols between the two adjacent S-PRS resource groups in the S-PRS resource set, and the time intervals between every two adjacent S-PRS resource groups are the same or different.

Particularly, the time intervals (N4) between every two adjacent S-PRS resource groups included in one S-PRS resource set are X0 slots or X1 symbols or both, where X0 and X1 are each a positive integer greater than or equal to 1.

Particularly, the quantity of S-PRS resources (N5) in each S-PRS resource group is the same.

The time interval (N6) between the two adjacent S-PRS resources included in one S-PRS resource group is one or both of the quantity of slots and the quantity of symbols between the two adjacent S-PRS resources in the S-PRS resource group, and the time intervals between every two adjacent S-PRS resources included in one S-PRS resource group are the same or different.

Particularly, the time intervals (N6) between every two adjacent S-PRS resources included in one S-PRS resource group are same Y0 slots or Y1 symbols or both, where Y0 and Y1 are each a positive integer greater than or equal to 1.

In the embodiments of the present disclosure, the slot refers to a physical slot, an NR air-interface slot, an uplink slot or a Sidelink slot, and the symbol refers to a physical OFDM symbol, an NR air-interface OFDM symbol, an uplink symbol or a Sidelink symbol.

The values of the above parameters are determined in accordance with at least one of the SCS used by the UE, the FR and the information carried in the PSBCH.

Figure 3:
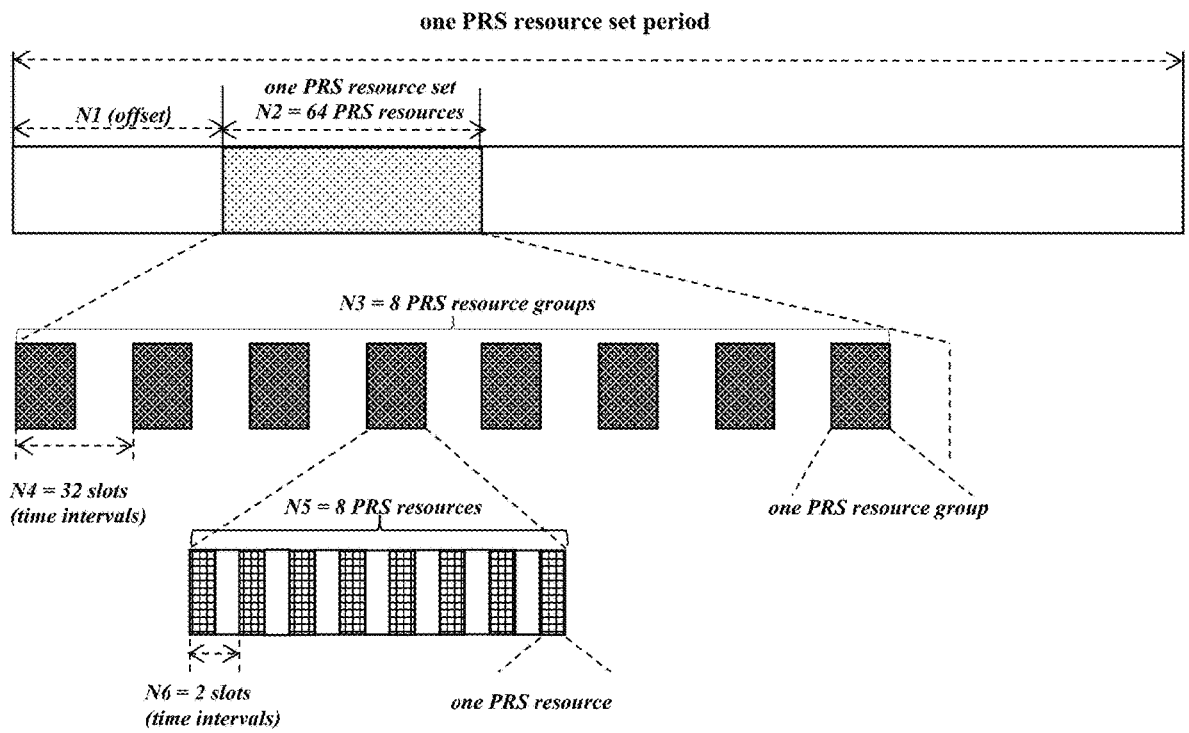
FIG. 3 is a schematic view showing a relative position configuration scheme of an S-PRS resource set according to an embodiment of the present disclosure.

As shown in FIG. 3, in order to preconfigure or configure one PRS resource in one PRS resource set, at least one of N1 to N6 in FIG. 3 needs to be configured. N1 refers to the information about the offset amount, and N4 and N6 refer to the information about the time intervals. Units of these three parameters are one or both of the quantity of slots and the quantity of symbols. For example, N1 is 240 slots, N4 is 32 slots, and N6 is 2 slots. N2, N3 and N5 are the information about the quantity of PRS resources or PRS resource groups. For example, N2 is 64 PRS resources, N3 is 8 PRS resource groups, and N5 is 8 PRS resources.

It should be appreciated that, as mentioned hereinabove, the values of the time interval (N4) between every adjacent PRS resource groups in a same PRS resource set may be different, i.e., N4 may have different values for one PRS resource set. Similarly, N6 may have different values for one PRS resource group.

Figure 4:
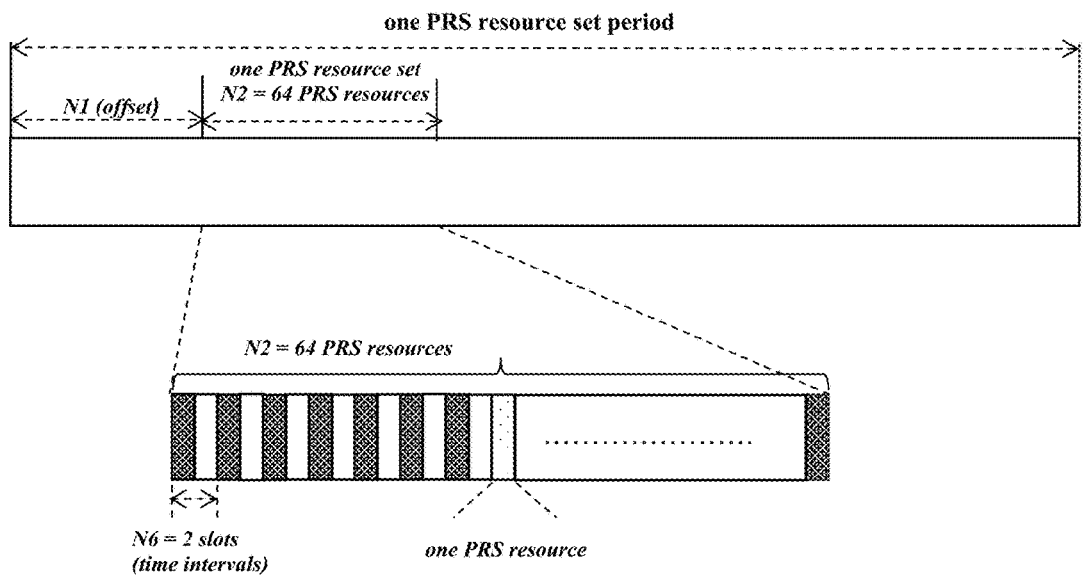
FIG. 4 is another schematic view showing the relative position configuration scheme of the S-PRS resource set according to an embodiment of the present disclosure.

Particularly, when N3, N4 and N5 are not configured, the entire S-PRS resource set includes just one S-PRS resource group. As shown in FIG. 4, there is no such a concept as S-PRS resource group, and one S-PRS resource set directly includes 64 S-PRS resources. At this time, merely at least one of N1, N2 and N6 needs to be configured for the transmission of the S-PRS resource.

In addition, a plurality of PRS resource sets may be configured within one PRS resource set period, and each PRS resource set may correspond to one Transmission Reception Point (TRP), so the present disclosure is not limited to such a condition where merely one PRS resource set has been configured.

Based on the above-mentioned configuration scheme, merely at least one of N1 to N6 needs to be configured to configure the transmission occasion of the PRS resource set. When the time intervals between every adjacent PRS resources are the same, it is able to configure the transmission occasion of the S-PRS resource through small signaling overhead, and at this time, it is able for the UE to obtain the information about the transmission occasion of the S-PRS resource in accordance with a configuration message.

In a possible embodiment of the present disclosure, at least one of a slot offset amount of each S-PRS resource relative to a second reference point or a symbol offset amount relative to a third reference point is preconfigured or configured.

In a possible embodiment of the present disclosure, the second reference point for the slot offset amount is one of a start position of an S-PRS resource set period, a first slot within a radio frame where a first S-PRS resource in an S-PRS resource set to which the S-PRS resource belongs is located, a slot where the first S-PRS resource included in the S-PRS resource set to which the S-PRS resource belongs is located, or a start position of the S-PRS resource set to which the S-PRS resource belongs.

In a possible embodiment of the present disclosure, the third reference point for the symbol offset amount is a first symbol within a slot where the S-PRS resource is located.

During the implementation, in an absolute position configuration scheme for the S-PRS resource, at least one of a slot offset amount of each S-PRS resource relative to the second reference point or a symbol offset amount relative to the third reference point is preconfigured or configured.

The second reference point for the slot offset amount is one of the start position of the S-PRS resource set period, the first slot (slot 0) within a radio frame where a first S-PRS resource in an S-PRS resource set to which the S-PRS resource belongs is located, a slot where the first S-PRS resource included in the S-PRS resource set to which the S-PRS resource belongs is located, or a start position of the S-PRS resource set to which the S-PRS resource belongs.

The third reference point for the symbol offset amount is a first symbol within a slot where the S-PRS resource is located.

Figure 5:
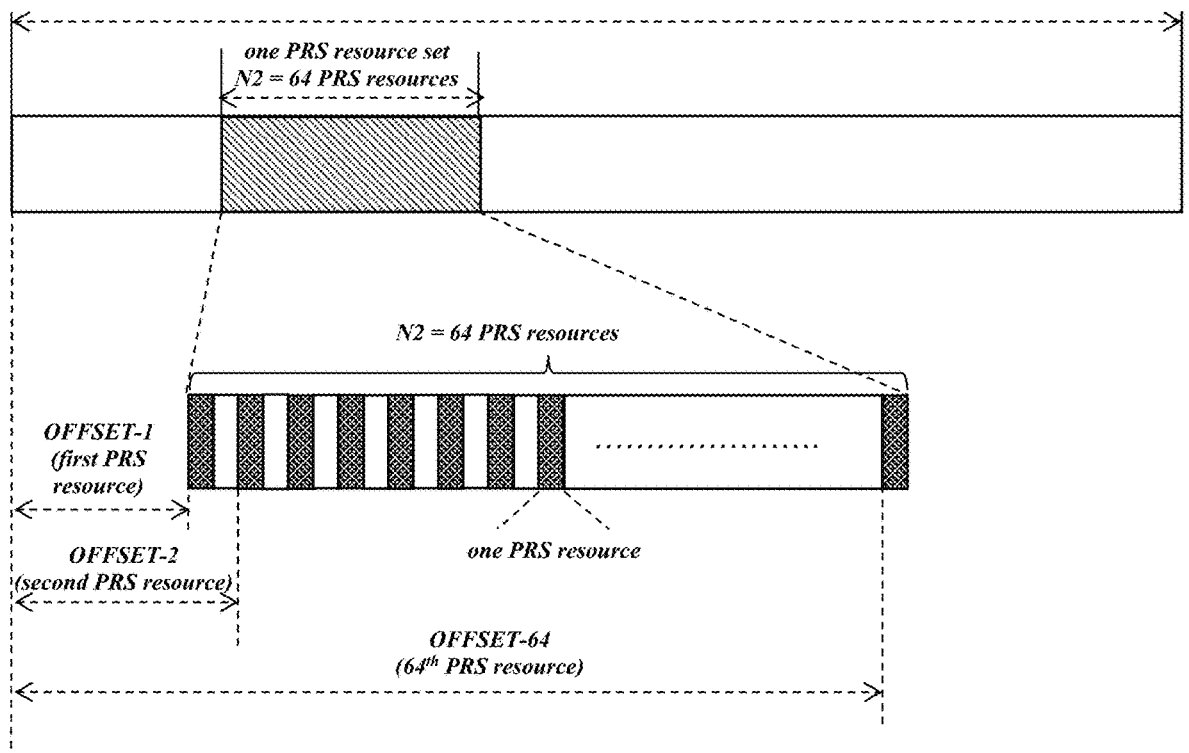
FIG. 5 is a schematic view showing an absolute position configuration scheme of the S-PRS resource set according to an embodiment of the present disclosure.

As shown in FIG. 5, for all the S-PRS resources in one S-PRS resource set, with a first slot (slot 0) within a radio frame where a first S-PRS resource included in the S-PRS resource set to which the S-PRS resource belongs is located as a reference point, the quantity of slots between the reference point and the S-PRS resource is calculated, and then the quantity of the slots is taken as the slot offset amount of the S-PRS resource.

The symbol offset amount refers to the quantity of symbols by which the S-PRS resource is offset from the first symbol within the slot.

Based on the above-mentioned configuration scheme, it is necessary to preconfigure or configure at least one of the slot offset amount of each S-PRS resource relative to the second reference point or the symbol offset amount relative to the third reference point, so that the UE obtains information about a transmission occasion for the S-PRS resource from the configuration message in a flexible manner.

In a possible embodiment of the present disclosure, the quantity of symbols occupied by each S-PRS resource in one S-PRS resource set is configurable.

In a possible embodiment of the present disclosure, the quantity of symbols occupied by each S-PRS resource in one S-PRS resource set is the same.

In a possible embodiment of the present disclosure, when a normal Cyclic Prefix (CP) is configured in a system, the quantity of symbols occupied by one S-PRS resource is 2, 4, 6 or 12, and when an extended CP is configured in the system, the quantity of symbols occupied by one S-PRS resource is 2, 4 or 6.

In the embodiments of the present disclosure, specifically the quantity of symbols occupied by each S-PRS resource is described as follows. The quantity of symbols occupied by each S-PRS resource in one S-PRS resource set is configurable, and particularly the quantity of symbols occupied by each S-PRS resource in one S-PRS resource set is the same.

When the normal CP is configured in the system, the quantity of symbols occupied by one S-PRS resource is 2, 4, 6 or 12, and when the extended CP is configured in the system, the quantity of symbols occupied by one S-PRS resource is 2, 4 or 6.

In order to simplify the configuration and considering the consistency when different S-PRS resources are measured by the UE, the quantity of symbols occupied by each S-PRS resource in one S-PRS resource set is the same.

Within Sidelink slots, a first symbol within each slot is AGC and a last symbol is GP. Hence, when the normal CP is configured in the system, the quantity of available symbols within one slot is 12, and when the extended CP is configured in the system, the quantity of available symbols within one slot is 10. When the normal CP is configured in the system, the quantity of symbols occupied by one S-PRS resource is 2, 4, 6 or 12, and when the extended CP is configured in the system, the quantity of symbols occupied by one S-PRS resource is 2, 4 or 6.

In the embodiments of the present disclosure, the maximum quantity of available symbols for one S-PRS resource may be flexibly selected in accordance with whether the normal CP or the extended CP is configured in the system, so as to be adapted to characteristics of the Sidelink slot.

In a possible embodiment of the present disclosure, the quantity of S-PRS resources in one S-PRS resource set is the same as the quantity of S-SSBs in a set of Sidelink synchronous resources within a Sidelink synchronization period.

In a possible embodiment of the present disclosure, an S-PRS period configured by the UE is the same as the Sidelink synchronization period.

In a possible embodiment of the present disclosure, when a beam direction of an S-PRS resource is the same as a beam direction of an S-SSB, an index number of the S-PRS resource is the same as an index number of the S-SSB.

In a possible embodiment of the present disclosure, each of the S-PRS resources having a same index number as the S-SSB transmission resource is offset by a same offset amount from the S-SSB transmission resource, and the offset amount is configurable.

In the embodiments of the present disclosure, a relationship between the S-PRS resource and the S-SSB resource will be described hereinafter. The quantity of S-PRS resources in one S-PRS resource set is the same as the quantity of S-SSBs in a set of synchronization resources within one synchronization period. Especially, the S-PRS period is the same as the synchronization period. When the beam direction of the S-PRS resource is the same as the beam direction of the S-SSB, the index number of the S-PRS resource is the same as the index number of the S-SSB. The S-PRS resources having a same index number as the same index number as the S-SSB is offset by a same offset amount from the S-SSB, and the offset amount is configurable.

When one S-PRS resource set includes a plurality of S-PRS resources, its object is to transmit the S-PRS resources in different beam directions. Generally speaking, the quantity of S-PRS resources in one S-PRS resource set is the same as the quantity of beam directions. For the S-SSB set in the synchronization resource, the quantity of S-SSBs in one S-SSB set is also the same as the quantity of beams directions. Hence, the quantity of S-PRS resources in one S-PRS resource set should be the same as the quantity of S-SSBs in a set of synchronization resources within the synchronization period. Especially, the index number of the S-PRS resource in a same beam direction as the S-SSB is the same as the index number of the S-SSB. Through the same quantity and the same index number, it is able to simplify the configuration, and enable an index number of a strongest beam for the S-PRS resource identified in the positioning process to be the same as an index number of a strongest beam for the SSB identified in the synchronization process, thereby to reduce a scanning and identification delay for the strongest beam for the S-PRS resource, and increase an identification success rate of the strongest beam.

Figure 6:
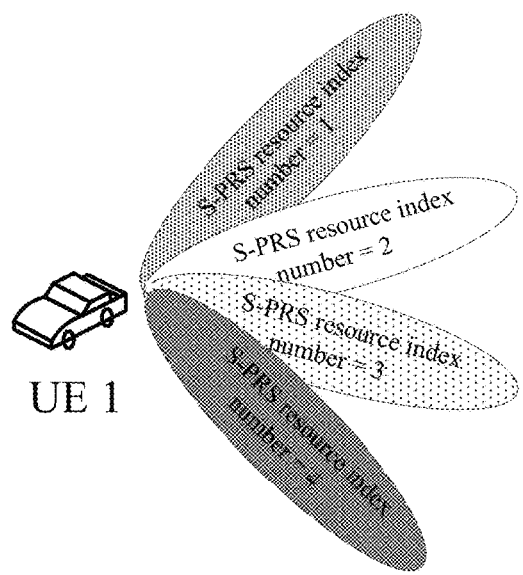
FIG. 6 is a schematic view showing S-PRS beam scanning performed by a UE 1 according to an embodiment of the present disclosure.

FIG. 6 shows S-PRS beam scanning by a UE 1, and FIG. 7 shows S-SSB beam scanning by the UE 1. As shown in FIGS. 6 and 7, one S-PRS resource set includes four S-PRS resources, and the quantity of S-PRS resources is the same as the quantity of S-SSBs. Different beam patterns represent different beam scanning directions, and in a same beam direction, an index number of the S-PRS resource is the same as the index number of the S-SSB.

The configuration of the S-PRS resource is interrelated with the configuration of the S-SSB, and the transmission occasion of the S-PRS resource having a same index as the S-SSB is offset from the transmission occasion of the S-SSB by a constant offset amount, so as to reduce the signaling overhead for configuring the transmission occasion of the S-PRS resource. For example, one S-SSB set includes four S-SSBs with transmission occasions as T1, T2, T3 and T4 respectively, and the transmission occasion of the S-PRS resource having a same index as the S-SSB is offset from the transmission occasion of the S-SSB by 6 slots. At this time, the transmission occasions of the four S-PRS resources in one S-PRS resource set are T1+6, T2+6, T3+6 and T4+6 respectively. In this way, it is able to reduce the signaling overhead for configuring the S-PRS resource as well as the configuration complexity.

In the embodiments of the present disclosure, the S-PRS resource is associated with the S-SSB resource, and such configuration parameters of the S-PRS resource as quantity, index number and transmission occasion are obtained in accordance with the configuration parameters of the S-SSB resource. As a result, it is able to reduce the signaling overhead for configuring the S-PRS resource as well as the configuration complexity.

In the embodiments of the present disclosure, the slot is a physical slot, an NR air-interface slot, an uplink slot or a Sidelink slot, and the symbol is a physical OFDM symbol, an NR air-interface OFDM symbol, an uplink symbol or a Sidelink symbol.

According to the method for configuring the transmission resource for the S-PRS in the embodiments of the present disclosure, a configuration scheme adapted to the S-PRS resource set has been given. Through this scheme, it is able for the UE to obtain information about the PRS resource in the S-PRS resource set with small signaling overhead, thereby to enable the UE to complete a Sidelink positioning process in accordance with the received S-PRS resource, and reduce the signaling overhead as well as the implementation complexity.

As shown in FIG. 8, the present disclosure provides in some embodiments a method for receiving a transmission resource for a PRS for a UE, including Step 81 of receiving an S-PRS resource set. An S-PRS resource included in the S-PRS resource set is preconfigured, or configured through PC5 RRC signaling, or configured through base station RRC signaling.

In a possible embodiment of the present disclosure, when the UE is outside a coverage range of a network device, the S-PRS resource is preconfigured, or configured through PC5 RRC signaling.

In a possible embodiment of the present disclosure, when the UE is within the coverage range of the network device, the S-PRS resource is configured through base station RRC signaling.

In a possible embodiment of the present disclosure, in a configuration pattern for each S-PRS resource included in the S-PRS resource set, at least one of the following parameters is pre-configured or configured through signaling: an offset amount of a first S-PRS resource in one S-PRS resource set relative to a first reference point; the quantity of S-PRS resources in one S-PRS resource set; the quantity of S-PRS resource groups included in one S-PRS resource set; a time interval between two adjacent S-PRS resource groups included in one S-PRS resource set; the quantity of S-PRS resources included in one S-PRS resource group; or a time interval between two adjacent S-PRS resources included in one S-PRS resource group.

In a possible embodiment of the present disclosure, the offset amount of the first S-PRS resource in one S-PRS resource set relative to the first reference point includes the quantity of slots and/or the quantity of symbols by which the first S-PRS resource in one S-PRS resource is offset relative to the first reference point.

In a possible embodiment of the present disclosure, the first reference point is at least one of a first slot within a first radio frame, a start position of an S-PRS resource set period to which the S-PRS resource belongs, or a first slot within a radio frame where the first S-PRS resource included in the S-PRS resource set to which the S-PRS resource belongs is located.

In a possible embodiment of the present disclosure, when one S-PRS resource set includes at least two S-PRS resource groups, the time interval between the two adjacent S-PRS resource groups in the S-PRS resource set is the quantity of slots and/or the quantity of symbols between the two adjacent S-PRS resource groups in the S-PRS resource set, and the time intervals between every two adjacent S-PRS resource groups are the same or different.

In a possible embodiment of the present disclosure, the time intervals between every two adjacent S-PRS resource groups included in one S-PRS resource set are X0 slots and/or X1 symbols, where X0 and X1 are each a positive integer greater than or equal to 1.

In a possible embodiment of the present disclosure, the quantity of S-PRS resources in each S-PRS resource group is the same.

In a possible embodiment of the present disclosure, the time interval between the two adjacent S-PRS resources included in one S-PRS resource group is the quantity of slots and/or the quantity of symbols between the two adjacent S-PRS resources in the S-PRS resource group, and the time intervals between every two adjacent S-PRS resources included in one S-PRS resource group are the same or different.

In a possible embodiment of the present disclosure, the time intervals between every two adjacent S-PRS resources included in one S-PRS resource group are Y0 slots and/or Y1 symbols, where Y0 and Y1 are each a positive integer greater than or equal to 1.

In a possible embodiment of the present disclosure, a value of the parameter is determined in accordance with at least one of an SCS used by the UE, a Frequency Range (FR) and information carried in a PSBCH.

In a possible embodiment of the present disclosure, at least one of a slot offset amount of each S-PRS resource relative to a second reference point or a symbol offset amount relative to a third reference point is preconfigured or configured.

In a possible embodiment of the present disclosure, the second reference point for the slot offset amount is one of a start position of an S-PRS resource set period, a first slot within a radio frame where a first S-PRS resource in an S-PRS resource set to which the S-PRS resource belongs is located, a slot where the first S-PRS resource included in the S-PRS resource set to which the S-PRS resource belongs is located, or a start position of the S-PRS resource set to which the S-PRS resource belongs.

In a possible embodiment of the present disclosure, the third reference point for the symbol offset amount is a first symbol within a slot where the S-PRS resource is located.

In a possible embodiment of the present disclosure, the quantity of symbols occupied by each S-PRS resource in one S-PRS resource set is configurable.

In a possible embodiment of the present disclosure, the quantity of symbols occupied by each S-PRS resource in one S-PRS resource set is the same.

In a possible embodiment of the present disclosure, when a normal CP is configured in a system, the quantity of symbols occupied by one S-PRS resource is 2, 4, 6 or 12, and when an extended CP is configured in the system, the quantity of symbols occupied by one S-PRS resource is 2, 4 or 6.

In a possible embodiment of the present disclosure, the quantity of S-PRS resources in one S-PRS resource set is the same as the quantity of S-SSBs in a set of Sidelink synchronous resources within a Sidelink synchronization period.

In a possible embodiment of the present disclosure, an S-PRS period configured by the UE is the same as the Sidelink synchronization period.

In a possible embodiment of the present disclosure, when a beam direction of an S-PRS resource is the same as a beam direction of an S-SSB, an index number of the S-PRS resource is the same as an index number of the S-SSB.

In a possible embodiment of the present disclosure, each of the S-PRS resources having a same index number as an S-SSB transmission resource is offset by a same offset amount from the S-SSB transmission resource, and the offset amount is configurable.

In a possible embodiment of the present disclosure, the slot is a physical slot, an NR air-interface slot, an uplink slot or a Sidelink slot, and the symbol is a physical OFDM symbol, an NR air-interface OFDM symbol, an uplink symbol or a Sidelink symbol.

It should be appreciated that, the method is implemented at a receiving end corresponding to the method in FIG. 2, and the implementation of the method may refer to that of the method in FIG. 2 with a same technical effect.

As shown in FIG. 9, the present disclosure further provides in some embodiments a UE 90, which includes a transceiver 91, a processor 92, and a memory 93 storing therein a program to be executed by the processor 92. The processor 92 is configured to execute the program, so as to transmit an S-PRS resource set. An S-PRS resource included in the S-PRS resource set is preconfigured, or configured through PC5 RRC signaling, or configured through base station RRC signaling.

In a possible embodiment of the present disclosure, when the UE is outside a coverage range of a network device, the S-PRS resource is preconfigured, or configured through PC5 RRC signaling.

In a possible embodiment of the present disclosure, when the UE is within the coverage range of the network device, the S-PRS resource is configured through base station RRC signaling.

In a possible embodiment of the present disclosure, in a configuration pattern for each S-PRS resource included in the S-PRS resource set, at least one of the following parameters is pre-configured or configured through signaling: an offset amount of a first S-PRS resource in one S-PRS resource set relative to a first reference point; the quantity of S-PRS resources in one S-PRS resource set; the quantity of S-PRS resource groups included in one S-PRS resource set; a time interval between two adjacent S-PRS resource groups included in one S-PRS resource set; the quantity of S-PRS resources included in one S-PRS resource group; or a time interval between two adjacent S-PRS resources included in one S-PRS resource group.

In a possible embodiment of the present disclosure, the offset amount of the first S-PRS resource in one S-PRS resource set relative to the first reference point includes the quantity of slots and/or the quantity of symbols by which the first S-PRS resource in one S-PRS resource is offset relative to the first reference point.

In a possible embodiment of the present disclosure, the first reference point is at least one of a first slot within a first radio frame, a start position of an S-PRS resource set period to which the S-PRS resource belongs, or a first slot within a radio frame where the first S-PRS resource included in the S-PRS resource set to which the S-PRS resource belongs is located.

In a possible embodiment of the present disclosure, when one S-PRS resource set includes at least two S-PRS resource groups, the time interval between the two adjacent S-PRS resource groups in the S-PRS resource set is the quantity of slots and/or the quantity of symbols between the two adjacent S-PRS resource groups in the S-PRS resource set, and the time intervals between every two adjacent S-PRS resource groups are the same or different.

In a possible embodiment of the present disclosure, the time intervals between every two adjacent S-PRS resource groups included in one S-PRS resource set are X0 slots and/or X1 symbols, where X0 and X1 are each a positive integer greater than or equal to 1.

In a possible embodiment of the present disclosure, the quantity of S-PRS resources in each S-PRS resource group is the same.

In a possible embodiment of the present disclosure, the time interval between the two adjacent S-PRS resources included in one S-PRS resource group is the quantity of slots and/or the quantity of symbols between the two adjacent S-PRS resources in the S-PRS resource group, and the time intervals between every two adjacent S-PRS resources included in one S-PRS resource group are the same or different.

In a possible embodiment of the present disclosure, the time intervals between every two adjacent S-PRS resources included in one S-PRS resource group are Y0 slots and/or Y1 symbols, where Y0 and Y1 are each a positive integer greater than or equal to 1.

In a possible embodiment of the present disclosure, a value of the parameter is determined in accordance with at least one of an SCS used by the UE, an FR and information carried in a PSBCH.

In a possible embodiment of the present disclosure, at least one of a slot offset amount of each S-PRS resource relative to a second reference point or a symbol offset amount relative to a third reference point is preconfigured or configured.

In a possible embodiment of the present disclosure, the second reference point for the slot offset amount is one of a start position of an S-PRS resource set period, a first slot within a radio frame where a first S-PRS resource in an S-PRS resource set to which the S-PRS resource belongs is located, a slot where the first S-PRS resource included in the S-PRS resource set to which the S-PRS resource belongs is located, or a start position of the S-PRS resource set to which the S-PRS resource belongs.

In a possible embodiment of the present disclosure, the third reference point for the symbol offset amount is a first symbol within a slot where the S-PRS resource is located.

In a possible embodiment of the present disclosure, the quantity of symbols occupied by each S-PRS resource in one S-PRS resource set is configurable.

In a possible embodiment of the present disclosure, the quantity of symbols occupied by each S-PRS resource in one S-PRS resource set is the same.

In a possible embodiment of the present disclosure, when a normal CP is configured in a system, the quantity of symbols occupied by one S-PRS resource is 2, 4, 6 or 12, and when an extended CP is configured in the system, the quantity of symbols occupied by one S-PRS resource is 2, 4 or 6.

In a possible embodiment of the present disclosure, the quantity of S-PRS resources in one S-PRS resource set is the same as the quantity of S-SSBs in a set of Sidelink synchronous resources within a Sidelink synchronization period.

In a possible embodiment of the present disclosure, an S-PRS period configured by the UE is the same as the Sidelink synchronization period.

In a possible embodiment of the present disclosure, when a beam direction of an S-PRS resource is the same as a beam direction of an S-SSB, an index number of the S-PRS resource is the same as an index number of the S-SSB.

In a possible embodiment of the present disclosure, each of the S-PRS resources having a same index number as the S-SSB transmission resource is offset by a same offset amount from the S-SSB transmission resource, and the offset amount is configurable.

In a possible embodiment of the present disclosure, the slot is a physical slot, an NR air-interface slot, an uplink slot or a Sidelink slot, and the symbol is a physical OFDM symbol, an NR air-interface OFDM symbol, an uplink symbol or a Sidelink symbol.

It should be appreciated that, the UE in the embodiments of the present disclosure corresponds to the method in FIG. 2, so the implementation of the UE may refer to that of the method in FIG. 2 with a same technical effect. In the UE, the transceiver 91 communicates with the memory 93 and the processor 92 via a bus interface. A function of the processor 92 may also be implemented by the transceiver 91, and a function of the transceiver 91 may also be achieved by the processor 92. It should be further appreciated that, the UE in the embodiments of the present disclosure is capable of implementing all steps in the method with a same technical effect, and contents identical to those in the method embodiments and the beneficial effects will not be further particularly defined herein.

Figure 10:
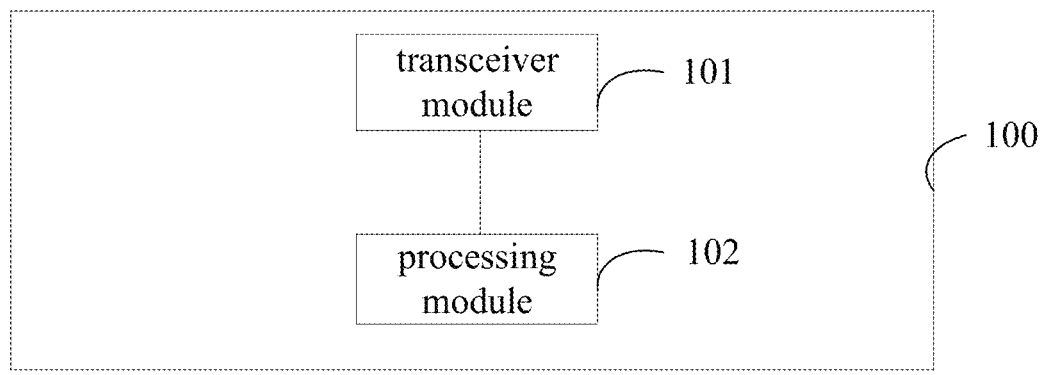
FIG. 10 is a block diagram of a device for configuring a transmission resource for a PRS for the UE at the transmitting side according to an embodiment of the present disclosure.

As shown in FIG. 10, the present disclosure further provides in some embodiments a device 100 for configuring a transmission resource for a PRS, including a transceiver module 101 configured to transmit an S-PRS resource set. An S-PRS resource included in the S-PRS resource set is preconfigured, or configured through PC5 RRC signaling, or configured through base station RRC signaling.

In a possible embodiment of the present disclosure, when the UE is outside a coverage range of a network device, the S-PRS resource is preconfigured, or configured through PC5 RRC signaling.

In a possible embodiment of the present disclosure, when the UE is within the coverage range of the network device, the S-PRS resource is configured through base station RRC signaling.

In a possible embodiment of the present disclosure, in a configuration pattern for each S-PRS resource included in the S-PRS resource set, at least one of the following parameters is pre-configured or configured through signaling: an offset amount of a first S-PRS resource in one S-PRS resource set relative to a first reference point; the quantity of S-PRS resources in one S-PRS resource set; the quantity of S-PRS resource groups included in one S-PRS resource set; a time interval between two adjacent S-PRS resource groups included in one S-PRS resource set; the quantity of S-PRS resources included in one S-PRS resource group; or a time interval between two adjacent S-PRS resources included in one S-PRS resource group.

In a possible embodiment of the present disclosure, the offset amount of the first S-PRS resource in one S-PRS resource set relative to the first reference point includes the quantity of slots and/or the quantity of symbols by which the first S-PRS resource in one S-PRS resource is offset relative to the first reference point.

In a possible embodiment of the present disclosure, the first reference point is at least one of a first slot within a first radio frame, a start position of an S-PRS resource set period to which the S-PRS resource belongs, or a first slot within a radio frame where the first S-PRS resource included in the S-PRS resource set to which the S-PRS resource belongs is located.

In a possible embodiment of the present disclosure, when one S-PRS resource set includes at least two S-PRS resource groups, the time interval between the two adjacent S-PRS resource groups in the S-PRS resource set is the quantity of slots and/or the quantity of symbols between the two adjacent S-PRS resource groups in the S-PRS resource set, and the time intervals between every two adjacent S-PRS resource groups are the same or different.

In a possible embodiment of the present disclosure, the time intervals between every two adjacent S-PRS resource groups included in one S-PRS resource set are X0 slots and/or X1 symbols, where X0 and X1 are each a positive integer greater than or equal to 1.

In a possible embodiment of the present disclosure, the quantity of S-PRS resources in each S-PRS resource group is the same.

In a possible embodiment of the present disclosure, the time interval between the two adjacent S-PRS resources included in one S-PRS resource group is the quantity of slots and/or the quantity of symbols between the two adjacent S-PRS resources in the S-PRS resource group, and the time intervals between every two adjacent S-PRS resources included in one S-PRS resource group are the same or different.

In a possible embodiment of the present disclosure, the time intervals between every two adjacent S-PRS resources included in one S-PRS resource group are Y0 slots and/or Y1 symbols, where Y0 and Y1 are each a positive integer greater than or equal to 1.

In a possible embodiment of the present disclosure, a value of the parameter is determined in accordance with at least one of an SCS used by the UE, an FR and information carried in a PSBCH.

In a possible embodiment of the present disclosure, at least one of a slot offset amount of each S-PRS resource relative to a second reference point or a symbol offset amount relative to a third reference point is preconfigured or configured.

In a possible embodiment of the present disclosure, the second reference point for the slot offset amount is one of a start position of an S-PRS resource set period, a first slot within a radio frame where a first S-PRS resource in an S-PRS resource set to which the S-PRS resource belongs is located, a slot where the first S-PRS resource included in the S-PRS resource set to which the S-PRS resource belongs is located, or a start position of the S-PRS resource set to which the S-PRS resource belongs.

In a possible embodiment of the present disclosure, the third reference point for the symbol offset amount is a first symbol within a slot where the S-PRS resource is located.

In a possible embodiment of the present disclosure, the quantity of symbols occupied by each S-PRS resource in one S-PRS resource set is configurable.

In a possible embodiment of the present disclosure, the quantity of symbols occupied by each S-PRS resource in one S-PRS resource set is the same.

In a possible embodiment of the present disclosure, when a normal CP is configured in a system, the quantity of symbols occupied by one S-PRS resource is 2, 4, 6 or 12, and when an extended CP is configured in the system, the quantity of symbols occupied by one S-PRS resource is 2, 4 or 6.

In a possible embodiment of the present disclosure, the quantity of S-PRS resources in one S-PRS resource set is the same as the quantity of S-SSBs in a set of Sidelink synchronous resources within a Sidelink synchronization period.

In a possible embodiment of the present disclosure, an S-PRS period configured by the UE is the same as the Sidelink synchronization period.

In a possible embodiment of the present disclosure, when a beam direction of an S-PRS resource is the same as a beam direction of an S-SSB, an index number of the S-PRS resource is the same as an index number of the S-SSB.

In a possible embodiment of the present disclosure, each of the S-PRS resources having a same index number as the S-SSB transmission resource is offset by a same offset amount from the S-SSB transmission resource, and the offset amount is configurable.

In a possible embodiment of the present disclosure, the slot is a physical slot, an NR air-interface slot, an uplink slot or a Sidelink slot, and the symbol is a physical OFDM symbol, an NR air-interface OFDM symbol, an uplink symbol or a Sidelink symbol.

It should be appreciated that, the device in the embodiments of the present disclosure corresponds to the method in FIG. 2, so the implementation of the device may refer to that of the method in FIG. 2 with a same technical effect. The device further includes a processing module 102 configured to process information to be transmitted by the transceiver module 101. It should be further appreciated that, the device in the embodiments of the present disclosure is capable of implementing all steps in the method with a same technical effect, and contents identical to those in the method embodiments and the beneficial effects will not be further particularly defined herein.

Figure 11:
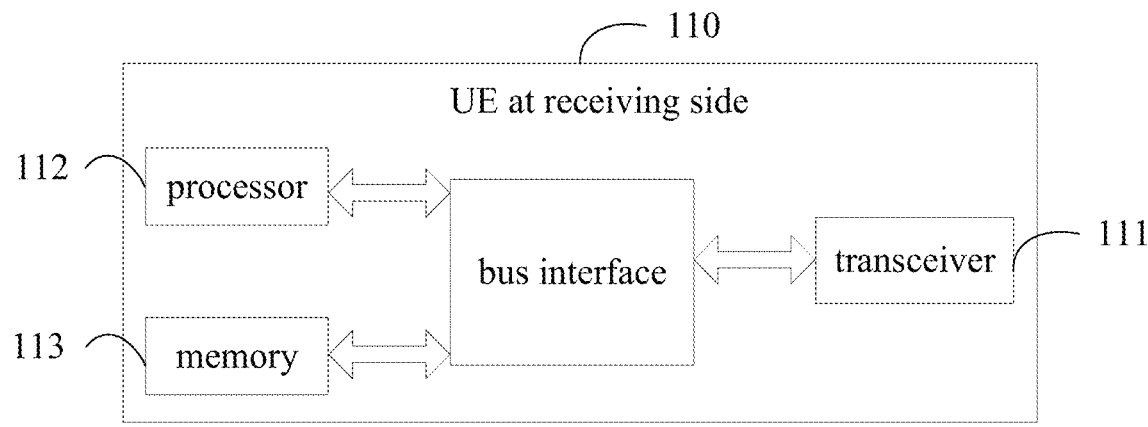
FIG. 11 is a schematic view showing architecture of a UE at a receiving side according to an embodiment of the present disclosure.

As shown in FIG. 11, the present disclosure further provides in some embodiments a UE 110, which includes a transceiver 111, a processor 112, and a memory 113 storing therein a program to be executed by the processor 112. The processor 112 is configured to execute the program, so as to receive an S-PRS resource set. An S-PRS resource included in the S-PRS resource set is preconfigured, or configured through PC5 RRC signaling, or configured through base station RRC signaling.

In a possible embodiment of the present disclosure, when the UE is outside a coverage range of a network device, the S-PRS resource is preconfigured, or configured through the PC5 RRC signaling.

In a possible embodiment of the present disclosure, when the UE is within the coverage range of the network device, the S-PRS resource is configured through the base station RRC signaling.

In a possible embodiment of the present disclosure, in a configuration pattern for each S-PRS resource included in the S-PRS resource set, at least one of the following parameters is pre-configured or configured through signaling: an offset amount of a first S-PRS resource in one S-PRS resource set relative to a first reference point; the quantity of S-PRS resources in one S-PRS resource set; the quantity of S-PRS resource groups included in one S-PRS resource set; a time interval between two adjacent S-PRS resource groups included in one S-PRS resource set; the quantity of S-PRS resources included in one S-PRS resource group; or a time interval between two adjacent S-PRS resources included in one S-PRS resource group.

In a possible embodiment of the present disclosure, the offset amount of the first S-PRS resource in one S-PRS resource set relative to the first reference point includes the quantity of slots and/or the quantity of symbols by which the first S-PRS resource in one S-PRS resource is offset relative to the first reference point.

In a possible embodiment of the present disclosure, the first reference point is at least one of a first slot within a first radio frame, a start position of an S-PRS resource set period to which the S-PRS resource belongs, or a first slot within a radio frame where the first S-PRS resource included in the S-PRS resource set to which the S-PRS resource belongs is located.

In a possible embodiment of the present disclosure, when one S-PRS resource set includes at least two S-PRS resource groups, the time interval between the two adjacent S-PRS resource groups in the S-PRS resource set is the quantity of slots and/or the quantity of symbols between the two adjacent S-PRS resource groups in the S-PRS resource set, and the time intervals between every two adjacent S-PRS resource groups are the same or different.

In a possible embodiment of the present disclosure, the time intervals between every two adjacent S-PRS resource groups included in one S-PRS resource set are X0 slots and/or X1 symbols, where X0 and X1 are each a positive integer greater than or equal to 1.

In a possible embodiment of the present disclosure, the quantity of S-PRS resources in each S-PRS resource group is the same.

In a possible embodiment of the present disclosure, the time interval between the two adjacent S-PRS resources included in one S-PRS resource group is the quantity of slots and/or the quantity of symbols between the two adjacent S-PRS resources in the S-PRS resource group, and the time intervals between every two adjacent S-PRS resources included in one S-PRS resource group are the same or different.

In a possible embodiment of the present disclosure, the time intervals between every two adjacent S-PRS resources included in one S-PRS resource group are Y0 slots and/or Y1 symbols, where Y0 and Y1 are each a positive integer greater than or equal to 1.

In a possible embodiment of the present disclosure, a value of the parameter is determined in accordance with at least one of an SCS used by the UE, an FR and information carried in a PSBCH.

In a possible embodiment of the present disclosure, at least one of a slot offset amount of each S-PRS resource relative to a second reference point or a symbol offset amount relative to a third reference point is preconfigured or configured.

In a possible embodiment of the present disclosure, the second reference point for the slot offset amount is one of a start position of an S-PRS resource set period, a first slot within a radio frame where a first S-PRS resource in an S-PRS resource set to which the S-PRS resource belongs is located, a slot where the first S-PRS resource included in the S-PRS resource set to which the S-PRS resource belongs is located, or a start position of the S-PRS resource set to which the S-PRS resource belongs.

In a possible embodiment of the present disclosure, the third reference point for the symbol offset amount is a first symbol within a slot where the S-PRS resource is located.

In a possible embodiment of the present disclosure, the quantity of symbols occupied by each S-PRS resource in one S-PRS resource set is configurable.

In a possible embodiment of the present disclosure, the quantity of symbols occupied by each S-PRS resource in one S-PRS resource set is the same.

In a possible embodiment of the present disclosure, when a normal CP is configured in a system, the quantity of symbols occupied by one S-PRS resource is 2, 4, 6 or 12, and when an extended CP is configured in the system, the quantity of symbols occupied by one S-PRS resource is 2, 4 or 6.

In a possible embodiment of the present disclosure, the quantity of S-PRS resources in one S-PRS resource set is the same as the quantity of S-SSBs in a set of Sidelink synchronous resources within a Sidelink synchronization period.

In a possible embodiment of the present disclosure, an S-PRS period configured by the UE is the same as the Sidelink synchronization period.

In a possible embodiment of the present disclosure, when a beam direction of an S-PRS resource is the same as a beam direction of an S-SSB, an index number of the S-PRS resource is the same as an index number of the S-SSB.

In a possible embodiment of the present disclosure, each of the S-PRS resources having a same index number as an S-SSB transmission resource is offset by a same offset amount from the S-SSB transmission resource, and the offset amount is configurable.

In a possible embodiment of the present disclosure, the slot is a physical slot, an NR air-interface slot, an uplink slot or a Sidelink slot, and the symbol is a physical OFDM symbol, an NR air-interface OFDM symbol, an uplink symbol or a Sidelink symbol.

It should be appreciated that, the UE in the embodiments of the present disclosure corresponds to the method in FIG. 8, so the implementation of the UE may refer to that of the method in FIG. 2 with a same technical effect. In the UE, the transceiver 111 communicates with the memory 113 and the processor 112 via a bus interface. A function of the processor 112 may also be implemented by the transceiver 111, and a function of the transceiver 111 may also be achieved by the processor 112. It should be further appreciated that, the UE in the embodiments of the present disclosure is capable of implementing all steps in the method with a same technical effect, and contents identical to those in the method embodiments and the beneficial effects will not be particularly further defined herein.

Figure 12:
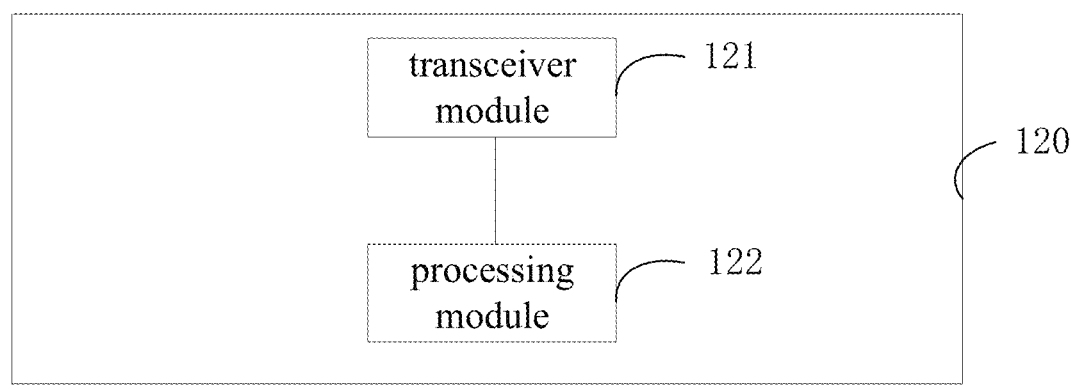
FIG. 12 is a block diagram of a device for receiving a transmission resource for a PRS for the UE at the receiving side according to an embodiment of the present disclosure.

As shown in FIG. 12, the present disclosure further provides in some embodiments a device 120 for receiving a transmission resource for a PRS, including a transceiver module 121 configured to receive an S-PRS resource set. An S-PRS resource included in the S-PRS resource set is preconfigured, or configured through PC5 RRC signaling, or configured through base station RRC signaling.

In a possible embodiment of the present disclosure, when the UE is outside a coverage range of a network device, the S-PRS resource is preconfigured, or configured through the PC5 RRC signaling.

In a possible embodiment of the present disclosure, when the UE is within the coverage range of the network device, the S-PRS resource is configured through the base station RRC signaling.

In a possible embodiment of the present disclosure, in a configuration pattern for each S-PRS resource included in the S-PRS resource set, at least one of the following parameters is pre-configured or configured through signaling: an offset amount of a first S-PRS resource in one S-PRS resource set relative to a first reference point; the quantity of S-PRS resources in one S-PRS resource set; the quantity of S-PRS resource groups included in one S-PRS resource set; a time interval between two adjacent S-PRS resource groups included in one S-PRS resource set; the quantity of S-PRS resources included in one S-PRS resource group; or a time interval between two adjacent S-PRS resources included in one S-PRS resource group.

In a possible embodiment of the present disclosure, the offset amount of the first S-PRS resource in one S-PRS resource set relative to the first reference point includes the quantity of slots and/or the quantity of symbols by which the first S-PRS resource in one S-PRS resource is offset relative to the first reference point.

In a possible embodiment of the present disclosure, the first reference point is at least one of a first slot within a first radio frame, a start position of an S-PRS resource set period to which the S-PRS resource belongs, or a first slot within a radio frame where the first S-PRS resource included in the S-PRS resource set to which the S-PRS resource belongs is located.

In a possible embodiment of the present disclosure, when one S-PRS resource set includes at least two S-PRS resource groups, the time interval between the two adjacent S-PRS resource groups in the S-PRS resource set is the quantity of slots and/or the quantity of symbols between the two adjacent S-PRS resource groups in the S-PRS resource set, and the time intervals between every two adjacent S-PRS resource groups are the same or different.

In a possible embodiment of the present disclosure, the time intervals between every two adjacent S-PRS resource groups included in one S-PRS resource set are X0 slots and/or X1 symbols, where X0 and X1 are each a positive integer greater than or equal to 1.

In a possible embodiment of the present disclosure, the quantity of S-PRS resources in each S-PRS resource group is the same.

In a possible embodiment of the present disclosure, the time interval between the two adjacent S-PRS resources included in one S-PRS resource group is the quantity of slots and/or the quantity of symbols between the two adjacent S-PRS resources in the S-PRS resource group, and the time intervals between every two adjacent S-PRS resources included in one S-PRS resource group are the same or different.

In a possible embodiment of the present disclosure, the time intervals between every two adjacent S-PRS resources included in one S-PRS resource group are Y0 slots and/or Y1 symbols, where Y0 and Y1 are each a positive integer greater than or equal to 1.

In a possible embodiment of the present disclosure, a value of the parameter is determined in accordance with at least one of an SCS used by the UE, an FR and information carried in a PSBCH.

In a possible embodiment of the present disclosure, at least one of a slot offset amount of each S-PRS resource relative to a second reference point or a symbol offset amount relative to a third reference point is preconfigured or configured.

In a possible embodiment of the present disclosure, the second reference point for the slot offset amount is one of a start position of an S-PRS resource set period, a first slot within a radio frame where a first S-PRS resource in an S-PRS resource set to which the S-PRS resource belongs is located, a slot where the first S-PRS resource included in the S-PRS resource set to which the S-PRS resource belongs is located, or a start position of the S-PRS resource set to which the S-PRS resource belongs.

In a possible embodiment of the present disclosure, the third reference point for the symbol offset amount is a first symbol within a slot where the S-PRS resource is located.

In a possible embodiment of the present disclosure, the quantity of symbols occupied by each S-PRS resource in one S-PRS resource set is configurable.

In a possible embodiment of the present disclosure, the quantity of symbols occupied by each S-PRS resource in one S-PRS resource set is the same.

In a possible embodiment of the present disclosure, when a normal CP is configured in a system, the quantity of symbols occupied by one S-PRS resource is 2, 4, 6 or 12, and when an extended CP is configured in the system, the quantity of symbols occupied by one S-PRS resource is 2, 4 or 6.

In a possible embodiment of the present disclosure, the quantity of S-PRS resources in one S-PRS resource set is the same as the quantity of S-SSBs in a set of Sidelink synchronous resources within a Sidelink synchronization period.

In a possible embodiment of the present disclosure, an S-PRS period configured by the UE is the same as the Sidelink synchronization period.

In a possible embodiment of the present disclosure, when a beam direction of an S-PRS resource is the same as a beam direction of an S-SSB, an index number of the S-PRS resource is the same as an index number of the S-SSB.

In a possible embodiment of the present disclosure, each of the S-PRS resources having a same index number as an S-SSB transmission resource is offset by a same offset amount from the S-SSB transmission resource, and the offset amount is configurable.

In a possible embodiment of the present disclosure, the slot is a physical slot, an NR air-interface slot, an uplink slot or a Sidelink slot, and the symbol is a physical OFDM symbol, an NR air-interface OFDM symbol, an uplink symbol or a Sidelink symbol.

It should be appreciated that, the device in the embodiments of the present disclosure corresponds to the method in FIG. 8, so the implementation of the device may refer to that of the method in FIG. 8 with a same technical effect. The device further includes a processing module 122 configured to process information to be transmitted by the transceiver module 121. It should be further appreciated that, the device in the embodiments of the present disclosure is capable of implementing all steps in the method with a same technical effect, and contents identical to those in the method embodiments and the beneficial effects will not be further particularly defined herein.

The present disclosure further provides in some embodiments a processor-readable storage medium storing therein an instruction executed by a processor. The processor is configured to execute the instruction so as to implement the above-mentioned method in FIG. 2 or 8 with a same technical effect.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be further particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a processor-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a Universal Serial Bus (USB) flash disk, a mobile Hard Disk (HD), a Read-Only Memory (ROM), a Random Access Memory (RAM), a magnetic disk or an optical disk.

It should be appreciated that, the embodiments of the present disclosure may be implemented by hardware, software, firmware, middleware, microcode or a combination thereof. For the hardware implementation, the processor may include one or more of an Application Specific Integrated Circuit (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. In addition, some steps may also be performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. It should be appreciated that, some steps may also be performed in parallel, or independently of each other.

The above are optional embodiments of the present disclosure. It should be note that, a person skilled in the art may make further modifications and improvements without departing from the principle of the present disclosure, and these modifications and improvements shall also fall within the scope of the present disclosure.

What is claimed is:

1. A method for configuring a transmission resource for a Positioning Reference Signal (PRS) for a User Equipment (UE), comprising:
    transmitting a Sidelink Positioning Reference Signal (S-PRS) resource set, wherein an S-PRS resource comprised in the S-PRS resource set is preconfigured, or configured through PCS Radio Resource Control (RRC) signaling, or configured through base station RRC signaling;
    wherein in a configuration pattern for each S-PRS resource comprised in the S-PRS resource set, at least one of following parameters is configured through signaling or pre-configured:
    an offset amount of a first S-PRS resource in one S-PRS resource set relative to a first reference point;
    the quantity of S-PRS resources in one S-PRS resource set;
    the quantity of S-PRS resource groups comprised in one S-PRS resource set;
    a time interval between two adjacent S-PRS resource groups comprised in one S-PRS resource set;
    the quantity of S-PRS resources comprised in one S-PRS resource group; and
    a time interval between two adjacent S-PRS resources comprised in one S-PRS resource group.

2. The method according to claim 1, wherein the offset amount of the first S-PRS resource in one S-PRS resource set relative to the first reference point comprises: the quantity of slots and/or the quantity of symbols by which the first S-PRS resource in one S-PRS resource is offset relative to the first reference point; or
    the first reference point is at least one of following positions: a first slot within a first radio frame; a start position of an S-PRS resource set period to which the S-PRS resource belongs; a first slot within a radio frame where the first S-PRS resource in the S-PRS resource set to which the S-PRS resource belongs is located.

3. The method according to claim 1, wherein
    when one S-PRS resource set comprises at least two S-PRS resource groups, the time interval between the two adjacent S-PRS resource groups in the S-PRS resource set is the quantity of slots and/or the quantity of symbols between the two adjacent S-PRS resource groups in the one S-PRS resource set, and the time intervals between every two adjacent S-PRS resource groups are same or different; or
    the time interval between the two adjacent S-PRS resources comprised in the one S-PRS resource group is the quantity of slots and/or the quantity of symbols between the two adjacent S-PRS resources in the one S-PRS resource group, and the time intervals between every two adjacent S-PRS resources in the one S-PRS resource group are same or different.

4. The method according to claim 3, wherein
    the time intervals between every two adjacent S-PRS resource groups in one S-PRS resource set are X0 slots and/or X1 symbols, respectively, where X0 and X1 are each a positive integer greater than or equal to 1.

5. The method according to claim 1, wherein the quantity of S-PRS resources comprised in each S-PRS resource group is same; or
    a value of the parameter is determined in accordance with at least one of a SubCarrier Spacing (SCS) used by the UE, a Frequency Range (FR), and information carried in a Physical Sidelink Broadcast Channel (PSBCH).

6. The method according to claim 1, wherein
    at least one of a slot offset amount of each S-PRS resource relative to a second reference point or a slot offset amount of each S-PRS resource relative to a symbol offset amount relative to a third reference point is preconfigured or configured.

7. The method according to claim 1, wherein the quantity of symbols occupied by each S-PRS resource in one S-PRS resource set is configurable,
    wherein when a normal Cyclic Prefix (CP) is configured in a system, the quantity of symbols occupied by the one S-PRS resource is 2, 4, 6 or 12;
    when an extended CP is configured in the system, the quantity of symbols occupied by the one S-PRS resource is 2, 4 or 6.

8. The method according to claim 1, wherein the quantity of S-PRS resources in one S-PRS resource set is same as the quantity of Sidelink-Synchronous Signal Blocks (S-SSBs) in a set of Sidelink synchronous resources within one Sidelink synchronization period; or an S-PRS period configured by the UE is same as the Sidelink synchronization periods.

9. A method for receiving a transmission resource for a PRS for a UE, comprising:
receiving an S-PRS resource set, wherein an S-PRS resource comprised in the S-PRS resource set is preconfigured, or configured through PC5 RRC signaling, or configured through base station RRC signaling;
wherein in a configuration pattern for each S-PRS resource comprised in the S-PRS resource set, at least one of following parameters is configured through signaling or pre-configured:
an offset amount of a first S-PRS resource in one S-PRS resource set relative to a first reference point;
the quantity of S-PRS resources in one S-PRS resource set:
the quantity of S-PRS resource groups comprised in one S-PRS resource set:
a time interval between two adjacent S-PRS resource groups comprised in one S-PRS resource set;
the quantity of S-PRS resources comprised in one S-PRS resource group; and
a time interval between two adjacent S-PRS resources comprised in one S-PRS resource group.

10. The method according to claim 9, wherein the offset amount of the first S-PRS resource in one S-PRS resource set relative to the first reference point comprises: the quantity of slots and/or the quantity of symbols by which the first S-PRS resource in one S-PRS resource is offset relative to the first reference point; or
the first reference point is at least one of following positions: a first slot within a first radio frame; a start position of an S-PRS resource set period to which the S-PRS resource belongs; a first slot within a radio frame where the first S-PRS resource in the S-PRS resource set to which the S-PRS resource belongs is located.

11. The method according to claim 9, wherein
when one S-PRS resource set comprises at least two S-PRS resource groups, the time interval between the two adjacent S-PRS resource groups in the S-PRS resource set is the quantity of slots and/or the quantity of symbols between the two adjacent S-PRS resource groups in the one S-PRS resource set, and the time intervals between every two adjacent S-PRS resource groups are same or different; or
the time interval between the two adjacent S-PRS resources comprised in the one S-PRS resource group is the quantity of slots and/or the quantity of symbols between the two adjacent S-PRS resources in the one S-PRS resource group, and the time intervals between every two adjacent S-PRS resources in the one S-PRS resource group are same or different.

12. The method according to claim 11, wherein
the time intervals between every two adjacent S-PRS resource groups in one S-PRS resource set are X0 slots and/or X1 symbols, respectively, where X0 and X1 are each a positive integer greater than or equal to 1.

13. The method according to claim 9, wherein the quantity of S-PRS resources in each S-PRS resource group is same.

14. The method according to claim 9, wherein
at least one of a slot offset amount of each S-PRS resource relative to a second reference point or a slot offset amount of each S-PRS resource relative to a symbol offset amount relative to a third reference point is preconfigured or configured.

15. The method according to claim 9, wherein the quantity of symbols occupied by each S-PRS resource in one S-PRS resource set is configurable.

16. The method according to claim 9, wherein the quantity of S-PRS resources in one S-PRS resource set is same as the quantity of S-SSBs in a set of Sidelink synchronous resources within one Sidelink synchronization period; or
an S-PRS period configured by the UE is same as the Sidelink synchronization period.

17. A UE, comprising a transceiver, a processor, and a memory
storing therein a program to be executed by the processor, wherein the processor 1s configured to
execute the program to:
transmit an S-PRS resource set, and an S-PRS resource comprised in the S-PRS
resource set is preconfigured, or configured through PC5 RRC signaling, or configured through
base station RRC signaling;
wherein in a configuration pattern for each S-PRS resource comprised in the S-PRS
resource set, at least one of following parameters is configured through signaling or pre-configured:
an offset amount of a first S-PRS resource in one S-PRS resource set relative to a first reference point;
the quantity of S-PRS resources in one S-PRS resource set:
the quantity of S-PRS resource groups comprised in one S-PRS resource set:
a time interval between two adjacent S-PRS resource groups comprised in one S-PRS resource set;
the quantity of S-PRS resources comprised in one S-PRS resource group; and
a time interval between two adjacent S-PRS resources comprised in one S-PRS resource group.

18. A UE, comprising a transceiver, a processor, and a memory storing therein a program to be executed by the processor, wherein the processor is configured to execute the program to implement the method according to claim 9.

* * * * *